(12) United States Patent
Merl et al.

(10) Patent No.: US 10,521,295 B2
(45) Date of Patent: Dec. 31, 2019

(54) LOW COST, HARDENED SINGLE BOARD COMPUTER FOR COMMAND AND DATA HANDLING

(71) Applicant: Los Alamos National Security, LLC, Los Alamos, NM (US)

(72) Inventors: Robert Bernard Merl, Los Alamos, NM (US); Paul Stanley Graham, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 38 days.

(21) Appl. No.: 15/985,536

(22) Filed: May 21, 2018

(65) Prior Publication Data

US 2018/0285192 A1 Oct. 4, 2018

Related U.S. Application Data

(63) Continuation-in-part of application No. 15/630,619, filed on Jun. 22, 2017.

(60) Provisional application No. 62/353,995, filed on Jun. 23, 2016.

(51) Int. Cl.
| | |
|---|---|
| *G06F 11/10* | (2006.01) |
| *G06F 11/07* | (2006.01) |
| *G06F 13/40* | (2006.01) |
| *G06F 11/14* | (2006.01) |
| *G06F 1/20* | (2006.01) |

(52) U.S. Cl.
CPC ........ *G06F 11/106* (2013.01); *G06F 11/0736* (2013.01); *G06F 11/1489* (2013.01); *G06F 13/4063* (2013.01); *G06F 1/206* (2013.01)

(58) Field of Classification Search
CPC ............... G06F 11/106; G06F 11/0736; G06F 11/1489; G06F 13/4063; G06F 1/206
See application file for complete search history.

(56) References Cited

U.S. PATENT DOCUMENTS

| | | | |
|---|---|---|---|
| 9,367,488 B1 * | 6/2016 | Ardalan | G06F 13/00 |
| 9,589,598 B1 * | 3/2017 | Gilley | G11C 5/005 |
| 2005/0027409 A1 * | 2/2005 | Marshall | G06F 15/7867 |
| | | | 701/13 |
| 2006/0036909 A1 * | 2/2006 | VanBuren | G06F 11/106 |
| | | | 714/15 |
| 2008/0052436 A1 * | 2/2008 | Sharma | G06F 13/4063 |
| | | | 710/301 |
| 2011/0078498 A1 * | 3/2011 | Flatley | G06F 11/004 |
| | | | 714/15 |

OTHER PUBLICATIONS

Goedeke et al., "Applying SpaceVPX modular open systems interconnect concepts", 2015 IEEE/AIAA 34th Digital Avionics Systems Conference (DASC), Conference Location: Prague, Czech Republic, Date of Conference: Sep. 13-17, 2015, pp. 1-14. (Year: 2015).*

* cited by examiner

*Primary Examiner* — Kyle Vallecillo
(74) *Attorney, Agent, or Firm* — Lewis Roca Rothgerber Christie LLP (57) ABSTRACT

A radiation hardened single board computer (SBC) includes a processor; synchronous dynamic random-access memory (SDRAM); non-volatile memory; a field programmable gate array (FPGA); and board-level physical layer interfaces.

17 Claims, 6 Drawing Sheets

LOW COST, HARDENED SINGLE BOARD COMPUTER FOR COMMAND AND DATA HANDLING

CROSS-REFERENCE TO RELATED APPLICATION(S)

The present application is a continuation-in-part of U.S. patent application Ser. No. 15/630,619, filed Jun. 22, 2017, which claims priority to and the benefit of U.S. Provisional Application No. 62/353,995, filed Jun. 23, 2016, entitled "LOW COST, HARDENED SINGLE BOARD COMPUTER FOR COMMAND AND DATA HANDLING", the entire contents of both of which are incorporated herein by reference.

STATEMENT REGARDING FEDERALLY SPONSORED RESEARCH OR DEVELOPMENT

The United States government has rights in this invention pursuant to Contract No. DE-AC52-06NA25396 between the United States Department of Energy and Los Alamos National Security, LLC for the operation of Los Alamos National Laboratory.

BACKGROUND

1. Field

Embodiments of the present invention relate to hardened single board computers for command and data handling.

2. Description of the Related Art

Radiation hardened processor boards for space flight tend to be large, expensive, and consume relatively high amounts of power.

SUMMARY

Embodiments of the present invention include a single-board computer (SBC) for deployment in space-flight applications.

Embodiments of the present invention include a SBC for deployment in space-flight applications that use SpaceVPX and OpenVPX.

Embodiments of the present invention include radiation hardened SBC having a processor application-specific integrated circuit (ASIC), synchronous dynamic random-access memory (SDRAM), non-volatile memory, a field programmable gate array (FPGA), and board-level physical layer interfaces configured to connect to an OpenVPX backplane and a SpaceVPX backplane. The board-level physical layer interfaces include a SpaceWire connection and an Ethernet connection.

Embodiments of the present invention include a physical layer having a first VPX connector and a second VPX connector. The SpaceWire connection is configured to connect with a control plane using the first VPX connector and the second VPX connector. The Ethernet connection is configured to connect with a control plane using the first VPX connector.

Embodiments of the present invention include a SBC where at least one of the processor ASIC and the FPGA includes an 8-port SpaceWire router.

Embodiments of the present invention include an FPGA having an Ethernet switch.

Embodiments of the present invention include an SBC that is configured to interface with one or more sensor boards via the OpenVPX backplane or the SpaceVPX backplane.

Embodiments of the present invention include an FPGA that is configured to perform automated error detection and correction for errors found in a plurality of SRAM programming memory of FPGAs of the sensor boards due to radiation induced single event effects.

Embodiments of the present invention include an FPGA that is configured to provide physical layer support for high-speed serial interfaces, Low-Voltage Differential Signaling (LVDS) interfaces, an Inter-IC (I2C) interface, and Joint Test Action Group (JTAG) interfaces.

Embodiments of the present invention include an FPGA including a flash controller and the nonvolatile memory includes flash memory managed by the flash controller.

Embodiments of the present invention include an SDRAM that has byte-wide power control and where the processor ASIC is configured to power cycle a physical location on the SDRAM when a single-event functional interrupt is detected.

Embodiments of the present invention include a processor ASIC configured to employ Reed-Solomon error encoding on the SDRAM.

Embodiments of the present invention include a radiation hardened SBC. The SBC includes a processor application-specific integrated circuit (ASIC) having a first 8-port SpaceWire router. The SBC also includes synchronous dynamic random-access memory (SDRAM) directly connected to the processor ASIC and a FPGA connected to the processor ASIC. The FPGA is configured to perform co-processing functions to reduce the load on the processor ASIC and the FPGA includes a second 8-port SpaceWire router and an Ethernet switch. The SBC also includes a board-level physical layer interface having a first VPX connector and a second VPX connector. The first and second SpaceWire routers are connected to the first VPX connector and the second VPX connector. The Ethernet switch is connected to the first VPX connector.

Embodiments of the present invention include a SBC where the first and second SpaceWire routers are connected to the first and second VPX connectors using at least one thin pipe.

Embodiments of the present invention include a SBC where the Ethernet switch is connected to the first VPX connector using at least one ultra-thin pipe.

Embodiments of the present invention include a SBC that is configured to operate in both SpaceVPX and OpenVPX environments.

Embodiments of the present invention include a SBC having an FPGA with a flash controller and the nonvolatile memory is flash memory managed by the flash controller.

Embodiments of the present invention include a SBC with a SDRAM having byte-wide power control and the processor ASIC is configured to power cycle a physical location on the SDRAM when a single-event functional interrupt is detected.

Embodiments of the present invention include a SBC where the processor is configured to employ Reed-Solomon error encoding on the SDRAM.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Embodiments of the present invention include a single-board computer (SBC) for deployment in space-flight applications. The SBC may meet the command- and data-handling requirements for missions requiring true space-grade radiation hardness and fault tolerance, for example, exceeding those that are typical in CubeSat and SmallSat applications. The SBC according to embodiments of the present invention may have a substantially lower cost, lower power, and smaller form factor than typical space-grade solutions presently available. The SBC according to some embodiments of the present invention may use the MicroTCA standard, which is smaller than common 6 U-sized solutions but still allows interoperability with a diverse ecosystem of commercial development equipment. The SBC according to some embodiments of the present invention may use the OpenVPX and/or the SpaceVPX standard instead of the MicroTCA standard. The SBC according to embodiments of the present invention may use QMLV or Class-S parts with total-ionizing-dose tolerance appropriate for deployment on long-term missions in earth orbit applications (e.g., medium Earth orbit (MEO) and geosynchronous Earth orbit (GEO) environments).

The Single-Board Computer (SBC) according to embodiments of the present invention may function as a payload processor for a set of instruments in earth orbit applications (e.g., MEO and GEO applications). Previous similar computers have used 6 U-sized (160 mm×233 mm) CompactPCI (cPCI) boards for the command- and data-handling function. Embodiments of the present invention may use a smaller form factor of MicroTCA and a lower power computing architecture. Some embodiments of the present invention may use the 6 U-sized (160 mm×233 mm) or similar form factor.

Instrument systems for use on satellites and in other space applications often include of a suite of sensor boards connected through a backplane to a processor board. The processor board is responsible for configuring the sensor boards, reading data from the sensor boards, and sending that data in a packaged format to the space-vehicle host. The processor board may also accept commands from the spacecraft and send state-of-health information to the spacecraft.

Traditional designs are based on the 6 U CompactPCI (cPCI) form factor. CompactPCI uses a synchronous parallel bus architecture that is limited to 66 MHz. While this is adequate for some applications, other applications may use high-speed serial protocols. For example, recent advances in technology are bringing multi-gigabit SerDes (Serializer Deserializer) to space-grade components.

MicroTCA is shorthand for the Micro Telecommunications Computing Architecture. It is part of a family of standards under the Advanced Telecommunication Computing Architecture (ATCA) and is maintained by the PCI Industrial Manufacturers Group (PICMG). ATCA systems support the use of Advanced Mezzanine Cards (AMCs) that reside on carrier cards. MicroTCA is a compact adaptation of ATCA that does away with carrier cards and allows users to insert AMCs directly into backplanes. AMCs come in several form factors. Some embodiments of the present invention use the "double-wide" or "midsize" standards for MicroTCA or AMCs. The card pitch in both cPCI and MicroTCA-midsize is 0.8 inches, but the area of the MicroTCA card is 38 in$^2$ as opposed to 57 in$^2$ for 6 U cPCI. Double-wide refers to the area and midsize refers to the pitch of the card.

VPX, OpenVPX, and SpaceVPX are a family of standards produced by VITA (VME International Trade Association). The SpaceVPX SBC is 160 mm×230 mm, fits in a 0.8 inch wide VPX slot, and the area of the board is approximately 57 inches squared.

The smaller size of MicroTCA, when applied to the entire package of instruments and not just the SBC (e.g., processor or payload processor), may allow for a reduction in the weight of the overall payload. Further, typical SBC designs consume much more than the approximately 6 W (e.g., 6.6 W or about 6.6 W or less) consumed for some embodiments of the present invention. In some embodiments, a SpaceVPX or OpenVPX board may consume roughly 8.5 W of power. The SBC may be referred to herein as a processor. Further, according to embodiments of the present invention, the SBC is a payload processor, and as such, the SBC may be referred to herein as a payload processor.

Figure 1:
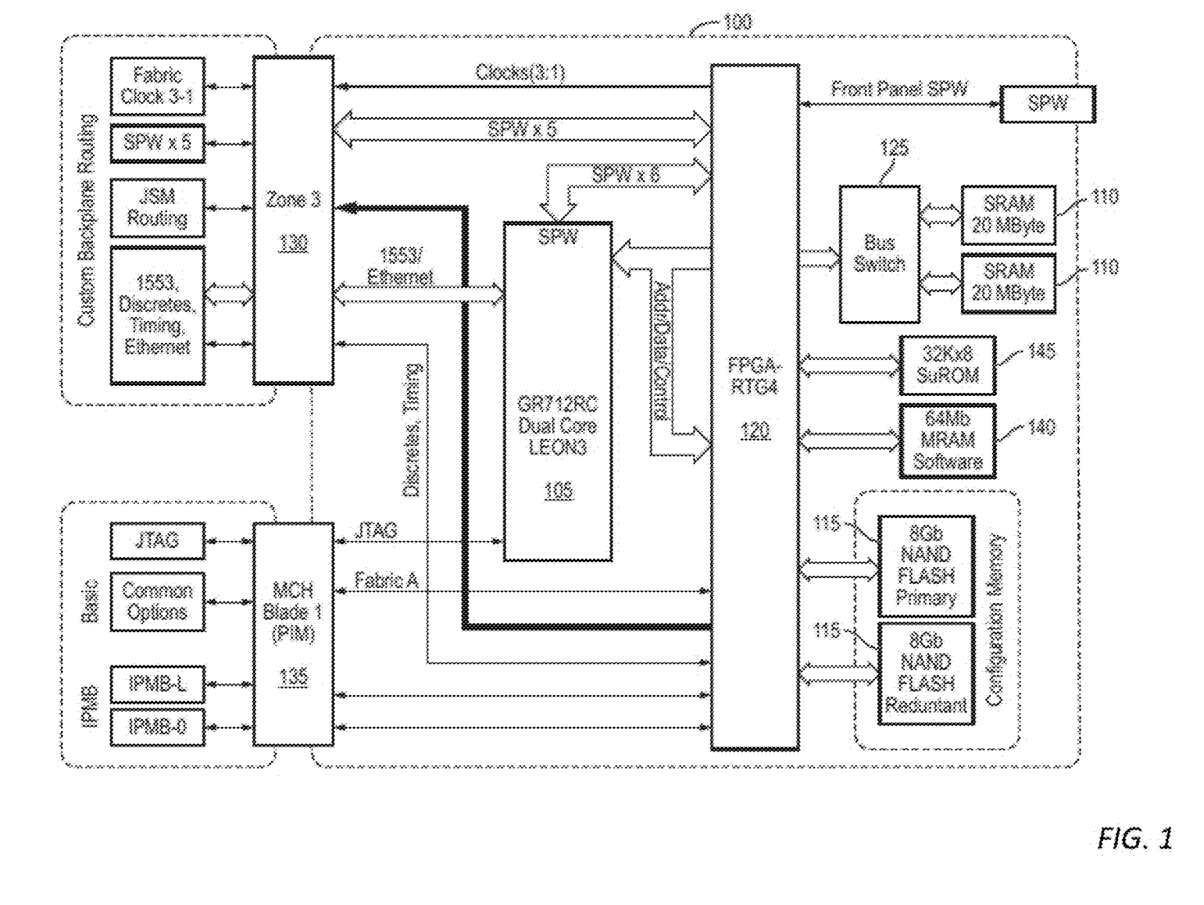
FIG. 1 is an architectural block diagram of a single board computer (SBC) according to an embodiment of the present invention.
Figure 2:
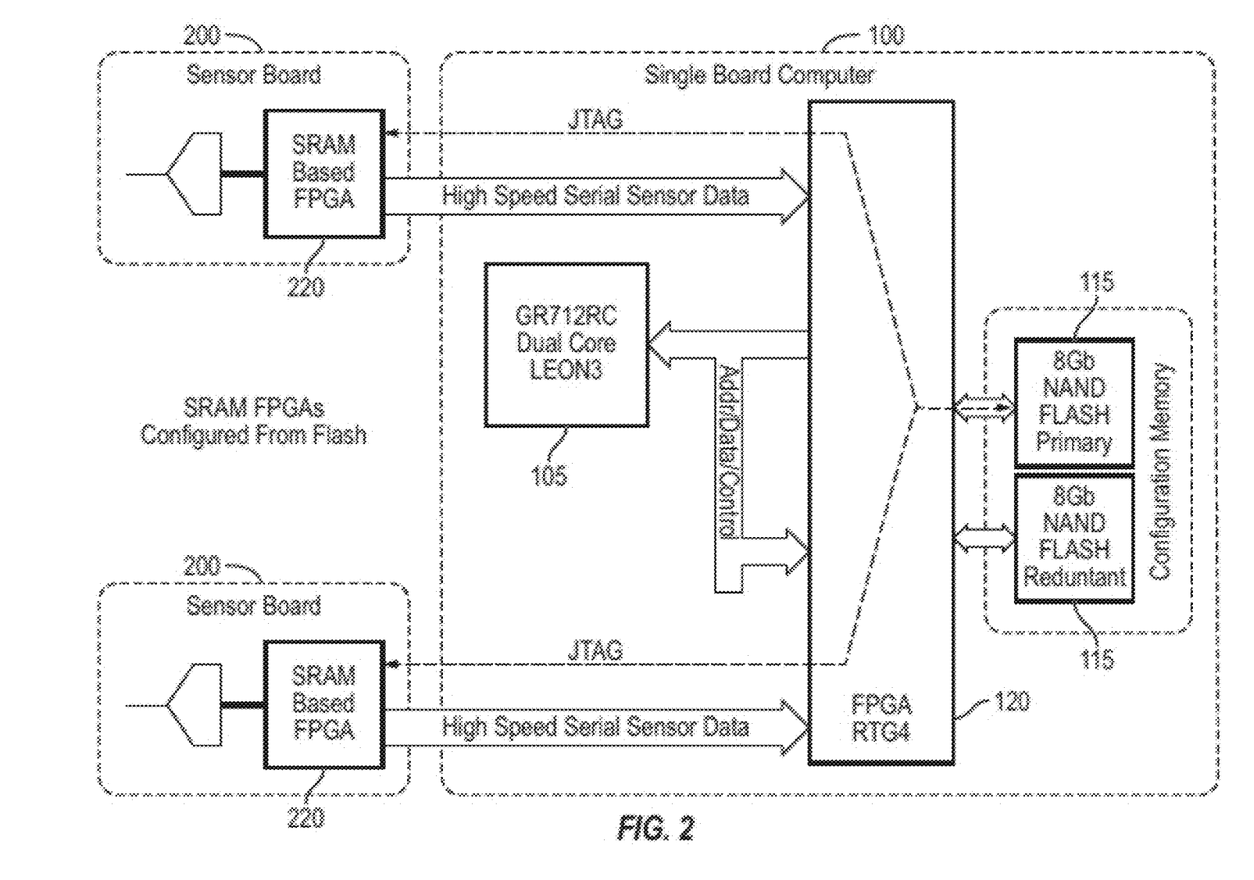
FIG. 2 is a sensor board configuration diagram using the single board computer (SBC) according to an embodiment of the present invention.

FIG. 1 is an architectural block diagram of a single board computer (SBC) according to an embodiment of the present invention. FIG. 2 is a sensor board configuration diagram showing a single board computer (SBC) and other modules according to an embodiment of the present invention. FIG. 2 is a diagram showing how the other modules beside the SBC in the overall system that use non-radiation hardened or SRAM FPGAs can be scrubbed for radiation induced errors and those errors can be corrected using the SBC.

Referring to FIGS. 1 and 2, the SBC 100 according to embodiments of the present invention may include a processor 105 (e.g., an application-specific integrated circuit (ASIC) or application-specific processor), random-access memory (RAM) 110 (e.g. DRAM, SRAM, or SDRAM), non-volatile memory (e.g., NAND flash) 115, a field-programmable gate array (FPGA) 120, and board-level physical layer interfaces.

Figure 3:
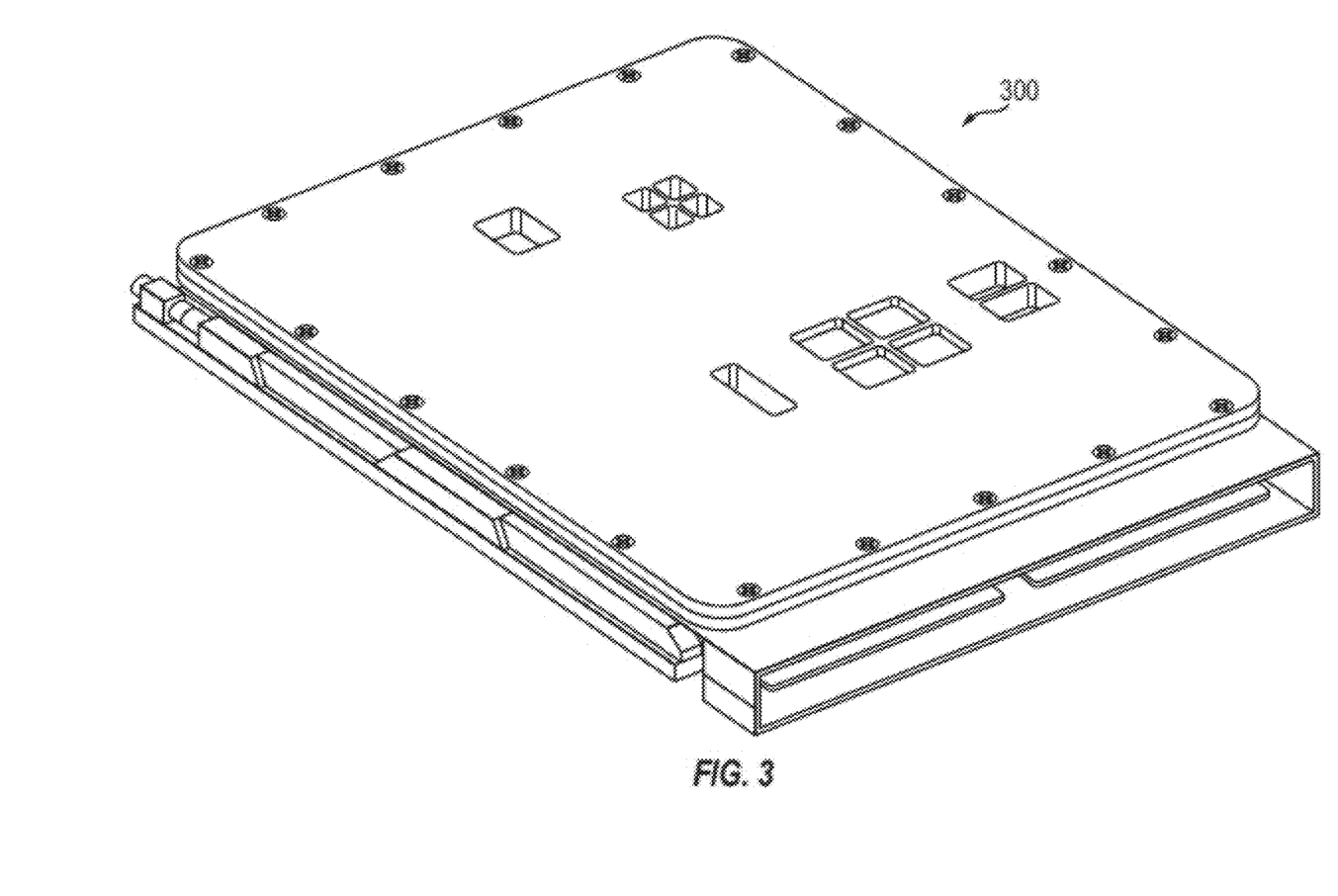
FIG. 3 is a perspective view of a conduction cooled enclosure for a single board computer (SBC) according to an embodiment of the present invention.

Cooling and mechanical hardness of the SBC 100 may be achieved with a custom conduction-cooled frame that fits around the MicroTCA-form-factor printed circuit board (see FIG. 3). A similar conduction cooled frame may be used for the SpaceVPX/OpenVPX board.

Referring again to FIGS. 1 and 2, the SBC 100 according to embodiments of the present invention may use a space-quality dual-core processor ASIC 105. The SBC 100 according to embodiments of the present invention may meet the command- and data-handling requirements of medium-sized missions. In other embodiments, however, the SBC may include a processor ASIC with more cores. For example, the SBC 100 may include quad-core processor ASIC.

The SBC 100 according to embodiments of the present invention may consume only about 6 W (e.g., 6.6 W or about 6.6 W or less) and may measure less than 7 inches×6 inches, the SBC 100 may support 9-gigabit/s class bidirectional SerDes links, 6 SpaceWire ports, redundant MIL-STD-1553B ports, EDAC protected RAM (e.g. 32 Mbytes of EDAC protected SRAM or 1 GB of SDRAM with 512 MB of EDAC), 2 GBytes of nonvolatile memory, and may support 200 MFLOPS operation. In another embodiment described with respect to FIG. 4 (below), the SBC 400 supports 1 GFLOP operation, has 1 GB of SDRAM with 512 MB of EDAC, two 8 port SpaceWire routers, 12 high-speed gigabit/s class SerDes links while consuming approximately 8.5 W of power. This SBC may be capable of communicating directly with a host space vehicle over both MIL-STD-1553B and SpaceWire interfaces.

The SBC 100 according to embodiments of the present invention may also support serial interfaces on its backplane connectors. The serial interfaces may include Inter-IC (I2C) and multi-gigabit SerDes-based protocols. The design may also support discrete Input/Output (I/O) interfaces that can be connected to other boards on the backplane or to the space vehicle. The SBC 100 may accept space-vehicle clocks that can be used for system timing.

The SBC 100 may be mapped onto the MicroTCA standard and may perform as a simple MicroTCA Carrier Hub (MCH) or as a standard AMC card. In other embodiments, for example, the SBC described with reference to FIG. 4, the SBC may be mapped onto the SpaceVPX or OpenVPX standard and may perform as a SpaceVPX System Controller.

Figure 4:
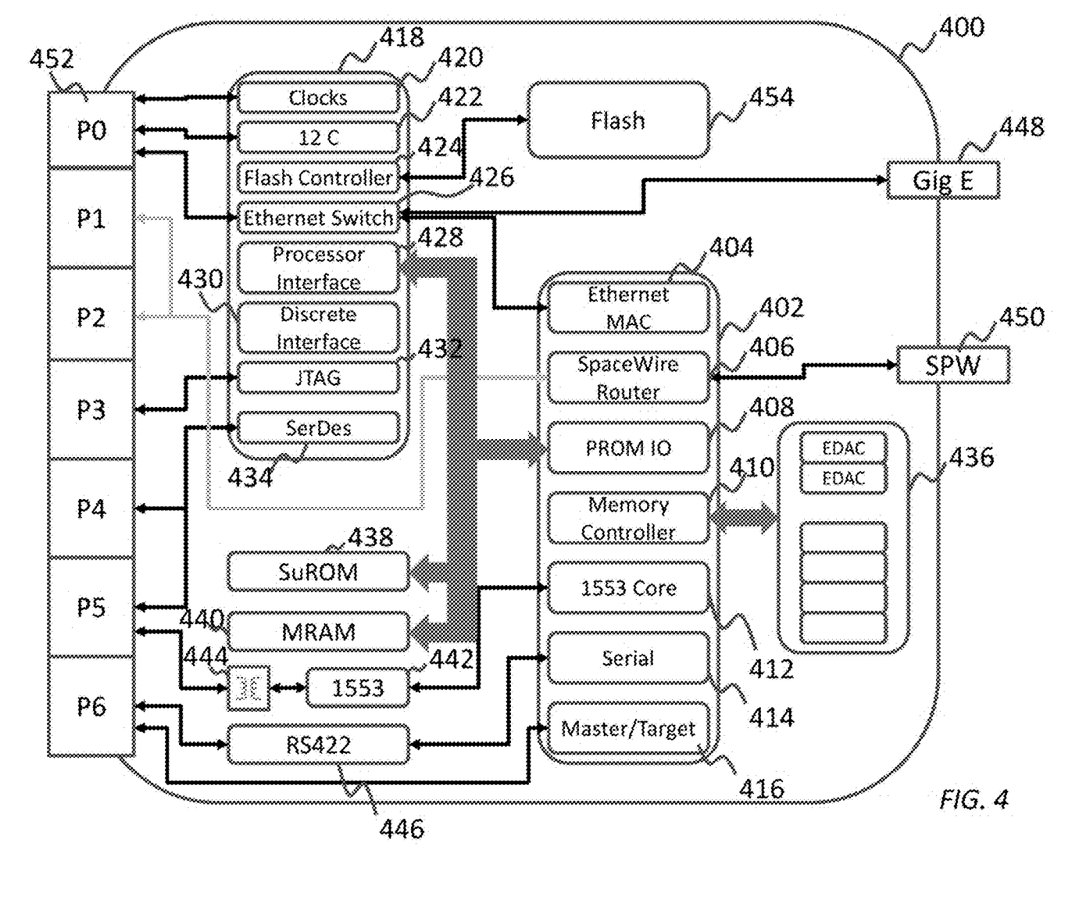
FIG. 4 is an architectural block diagram of a single board computer (SBC) according to an embodiment of the present invention.

The processor ASIC 105 or 402 may execute flight software and may be at the top of the command- and data-handling control hierarchy. The processor ASIC 105 or 402 may occupy the top level of control for this board. The processor ASIC 105 or 402 may boot from code stored in the external non-volatile memories 140 or 430 and 145 or 440, transfer flight software to RAM 110 or 436, and then begin execution of flight software from RAM 110.

The processor ASIC 105 may have built-in hardware support for SpaceWire (e.g. the ASIC may include an 8-port router), Serial Peripheral Interface bus (SPI), SDRAM (e.g. the ASIC may include a memory controller), error detection and correction (EDAC) on external memories, and the MIL-STD-1553B encoding and decoding standards.

The processor ASIC 105 may be based on a dual-core LEON3 processor application-specific integrated circuit (ASIC).

For example, the ASIC 105 may be the Cobham Gaisler GR712RC™, which is space qualified, radiation tolerant to 300 krad, and fault tolerant. The GR712RC is manufactured on 180-nm CMOS. It has internal Advanced Microcontroller Bus Architecture (AMBA) buses with peripherals that support external memory, Joint Test Action Group (JTAG)-based debugging, 6 SpaceWire ports, 10/100 Ethernet, and MIL-STD-1553B. The GR712RC has a floating-point unit for each of its two cores. The GR712RC may be clocked for both cores at 100 MHz, which yields a 200 MFLOP (floating-point operations per second) theoretical maximum performance. The processor's internal and external memories may be protected from single-event radiation effects with error detection and correction (EDAC) circuitry. The processor 105 may be capable of running VxWorks™, RTEMS, and/or Linux.

According to some embodiments, the highest performance memories in this system may be the two 20-Mbyte SRAMs 110. The SRAMs 110 may be organized with a bus width that is 40-bits wide instead of 32, which is optimized for the error detection and correction (EDAC) hardware built into the processor ASIC 105. The processor 105 may read or write 32 bits of data, plus another 7 EDAC bits, in a single operation to the SRAMs. Since 7 EDAC bits may be used to cover a 32-bit data word for single-error correction and double-error detection (SECDED)—for a total of 39 bits, one bit in every 40-bit word may be unused. After the EDAC bits are accounted for, the usable SRAM 110 memory space is 32 Mbytes of protected memory.

According to some embodiments, the highest performance memories in this system may be 1 GB of SDRAM 436. The processor ASIC 402 may be connected directly to the SDRAM. In some embodiments, the SDRAM may include byte-wide power control to support recovery from single-event functional interrupts (SEFIs). The SDRAM 436 may be organized with a bus width that is 48-bits wide, and is also optimized for the error detection and correction (EDAC) hardware built into the processor ASIC 105. The processor 402 may read or write 32 bits of data, plus another 16 EDAC bits, in a single operation to the SDRAM 110. Logically, the memory may be organized with 96-bit words having 64 data bits and 32 EDAC bits. In some embodiments, ASIC 402 maps the larger logical data bus onto consecutive physical locations. The processor ASIC 402 employs error correction on the SDRAM 436. For example, in some embodiments, the processor ASIC 402 may employ Reed-Solomon correction on the SDRAM 436. The error correction scheme may correct for nibble errors in any two adjacent nibbles and therefore tolerate the complete failure of any 8-bit wide physical devices due to a SEFI. The SEFI may be cleared with a power cycle of the affected SDRAM memory devices and the memory is regenerated by the processor ASIC 402 in a recovery operation.

To reduce capacitive bus loading and improve system timing, a bus switch 125 may be added to the design between the processor ASIC 105 and the two SRAM 110 memories. The bus switch 125 may behave as a set of low-delay FET switches that connects one memory IC or the other to the processor, but not both at the same time. This may cut the capacitive load on the processor bus by almost a factor of two.

MIL-STD-1553B is a 1 megabit/s redundant bus that is commonly used in space systems. As an example, the processor 105 may have a 1553 bus controller, remote terminal, and bus monitor core built into the ASIC hardware. The 1553 core may be wired to pins on the optional MicroTCA Zone 3 connector 130.

The FPGA 120 or 418 may provide a platform for custom hardware co-processing functions to reduce the load on the processor ASIC 105 or 402. As an example, spare FPGA resources can be used to implement functions such as digital filters, Fast Fourier Transforms (FFTs), or other mathematically intense algorithms so that the FPGA 120 or 418 performs as a hardware accelerator for the processor ASIC 105.

The FPGA 120 or 402 may also have built-in physical layer support for various physical-layer interfaces. For example, the FPGA 120 may have physical interfaces for high-speed serial, Low-Voltage Differential Signaling (LVDS), I2C, and JTAG (Joint Test Action Group) interfaces. These capabilities may be hard IP blocks instantiated in the FPGA 120 that can be accessed by configurable designs (e.g., soft designs) in the user fabric of the FPGA 120.

In FIG. 1, the blocks labeled IPMB-L and IPMB-0 may be I2C links for management of other cards in the system via the Intelligent Platform Management Interface (IPMI) protocol. The "common options" block may represent the optional high-speed serial protocols supported within the standard, such as Gigabit Ethernet.

Firmware and/or software for the FPGA 120 or 418 according to embodiments of the present invention may be capable of interfacing with the nonvolatile memories and provide error detection and correction for sensor or instrument boards 200 (e.g., for SRAM FPGAs of instruments boards). The sensor or instrument boards 200 may be located elsewhere in the payload (e.g., not located within the SBC 100 or 400). Sensor boards and instrument boards may be used interchangeably herein.

The SBC 100 or 400 may have deep non-volatile memory 115 or 454 (e.g., a gigabyte or more of non-volatile memory) that is designed to store configuration data for SRAM-based FPGAs 220 hosted on other boards 200 within the system. The other boards 200 may be located elsewhere in the payload (e.g., not located within the SBC 100). Due to the volatility of their programming memory, these FPGAs 220 may be programmed after power up. The SBC 100 or 400 may have hardware, firmware, and software and, during operation, may perform automated error detection and correction for errors found on other modules 200 in the system. Those other modules 200 have SRAM based FPGAs 220 that can develop errors in their programming memory due to radiation-induced single-event effects. For example, FIG. 2 illustrates the programming of SRAM-based FPGAs 220 on sensor boards 200 in the instrument system from local SBC flash memory.

As an example, a Microsemi RTG4™ FPGA may be used. A Microsemi RTG4™ FPGA may support hardware co-processing functions for the GR712RC. The RTG4™ is a radiation-tolerant FPGA that can be reconfigured in-circuit. The RTG4™-150 has 151,000 logic elements, 720 user IOs, 5.3 Mbits of SRAM, and 24 multi-gigabit SerDes. These high-speed SerDes may be used to support the "common-options" lanes defined in the standard for primary communication with other AMC cards in a MicroTCA system. These high-speed lanes support Ethernet, PCI Express, and Serial RapidIO. The RTG4™ may directly support PCI Express endpoints in hardware and support Ethernet and Serial RapidIO at the physical layer. For a PCI Express root complex, Ethernet, and Serial RapidIO, full stacks may be instantiated as IP cores in the fabric.

The FPGA 120 may be mapped into the I/O space of the GR712RC processor 105. The processor 105 may read and write to registers in this I/O space to communicate with the FPGA 120. Using this technique, the FPGA 120 may handle interface functions that would otherwise consume processor bandwidth. VHDL (Very high-speed integrated circuit Hardware Description Language) IP cores for the FPGA 120 may support interfaces such as flash memory interfaces, I2C Interfaces, SpaceWire, and JTAG.

The SBC 100 or 400 may provide two 8-gigabit NAND flash parts 115 or 454 from 3D-Plus that are radiation-tolerant. The VHDL flash memory controller may allow the processor 105 or 402 to easily read and write single bytes (or multiple bytes) from a flash memory, unlike traditional solutions that use a complex sequence of commands to erase, write, and read back entire 4-Kbyte blocks of memory at a time. This way, the processor 105 may interface with the flash memory as though it was an SRAM and the hardware-intensive activity of managing entire block reads and writes may be handled by the FPGA 120 or 418. When the processor 105 or 402 makes a single-byte write, the FPGA 120 or 418 may read the entire 4 Kbyte block into its memory, modify the byte being written, erase the flash block being accessed, and then write the entire block back to flash. This entire operation may be hidden from the processor 105 or 402. In this manner, the FPGA 120 or 418 may act as a hardware co-processor for flash interactions.

Unlike other forms of non-volatile memory, NAND flash 115 or 454 may be shipped from the manufacturer with some blocks that do not work properly. Blocks have additional "spare" bits associated with them that may be used to mark them as bad blocks. Bad blocks can also develop during the lifetime of the memory. Traditional systems set a status bit that indicates to the processor that a requested block is good or bad. According to embodiments of the present invention, a bad-block management scheme that either skips bad blocks or uses a more advanced block replacement method may be used.

Inter-IC (I2C) is a two-wire serial bus protocol that is commonly used for platform management. I2C typically runs at 400 kbit/sec. In MicroTCA, OpenVPX, or SpaceVPX, I2C buses may be used for initialization of power modules and other cards in on the backplane, to perform simple control, to request board information, and to request board state-of-health data. The I2C master may be instantiated in the FPGA 120 or 418 and may be interfaced to the processor 105 or 404 through the I/O space like the flash memory controller. The SBC 100 or 400 may also be capable of acting as an I2C slave.

As an extension to standard MicroTCA interfaces, an SBC 100 according to embodiments of the present invention may include SpaceWire ports at the backplane and/or the front panel. For example, the SBC 100 may include five or more SpaceWire ports at the backplane and one or more at the front panel.

SpaceWire uses LVDS and is natively compatible with MicroTCA backplane standards. The SpaceWire ports may be connected directly to the SpaceWire endpoints that are built into the GR712RC processor via the FPGA's LVDS transceivers or may be connected through a SpaceWire router instantiated in the FPGA.

MicroTCA, OpenVPX, and SpaceVPX support an IEEE 1149.1 (also known as JTAG) interface for each board in the system. These JTAG interfaces may connect from each board to the SBC, which can perform the function of a MicroTCA Carrier Hub or a SpaceVPX System Controller. JTAG connections are made on the connector 135 labelled Blade 1 or connector 452 labeled P0 and may be used to configure SRAM-based FPGAs 220 on other cards 200 in the system.

In the space environment, these SRAM-based FPGAs 220 may be scrubbed for bit errors in their configuration memory. VHDL for the SBC's FPGA 120 or 418 may configure SRAM-based FPGAs 220 on other AMC cards 200 and detect errors in their programming data. The VHDL may abstract the details of programming the FPGAs 220 over JTAG from the processor 105 or 402 and may provide continuous, automated error detection for the SRAM-based FPGAs' 220 programming data without intervention from the processor 105 or 402. When a bit error is detected in the configuration memory of an off-board SRAM-based FPGA 220, the processor 105 or 402 may receive a maskable interrupt. The processor software which is stored in MRAM 140 or 440 can then make a decision on how to handle the error, such as using the JTAG interface to fix the portion of programming data affected by the error.

The SBC 100 or 400 may scrub SRAM based FPGAs 220 on the sensor boards 200 by scanning their configuration memory and comparing what it sees in the scan with a set of local checksums. Local checksums may be stored in SRAM 110 or SDRAM 436 and may be derived from information that is stored in the flash memories 115. The local SBC FPGA 120 or 418 may do this part of the job (e.g., the scrubbing) autonomously without disturbing the SBC processor 105 or 402. In other words, the local SBC FPGA 120 may do this part of the job autonomously without any interaction from the SBC processor 105. If a radiation induced error is discovered on a sensor board SRAM based FPGA 220, the processor 105 may then be notified and the error may be fixed using a known good copy of the configuration from the deep radiation hardened memory on the SBC 100.

In addition to the flash storage 115, the SBC 100 or 400 may have two other types of non-volatile memory. The processor boot loader may reside in a 32K×8-bit radiation-hardened programmable read only memory (PROM) 145 or 438. Program code may be stored in an 8-Mbyte magneto-resistive RAM (MRAM) 140 or 440 and may be copied over to SRAM 110 or SDRAM 436 before execution begins. The MRAM and PROM are 8-bits wide and are buffered by the FPGA 120 or 418. The MRAM may have a high capacitive load compared with the FPGA 120 or 418. The FPGA 120 or 418 may lock or unlock portions of the MRAM to protect program code from being overwritten.

The printed circuit board of the SBC 100 or 400 of embodiments of the present invention may be manufactured to the IPC-6012-Class 3 standard and constructed from Isola FR408HR™ laminate.

Further, the SBC 100 of embodiments of the present invention may include JTAG Switch Module (JSM) routing, start-up read only memory (SuROM) 145, and a front panel SpaceWire port.

As shown in FIG. 1, Fabric A may include the clocking and high speed serial interconnect resources available in the AMC environment.

FIG. 3 is a perspective view of a conduction cooled enclosure 300 for a single board computer (SBC) according to an embodiment of the present invention.

According to embodiments of the present invention, the SBC may be housed in a conduction-cooled frame. For example, the conduction cooled frame may be manufactured from 6061-T6 aluminum and may use wedge locks. According to some embodiments of the present invention, the conduction cooled frame may be specifically designed to meet mission specific shock, vibration, and thermal requirements. These requirements typically exceed those published in NASA's General Environmental Verification Standard. A solid model of the conduction cooled frame and cover is shown in FIG. 3.

Table 1 shows the fabric utilization of the FPGA (e.g., a RTG4™ FPGA) according to an embodiment of the present invention. As shown, only 15% of the fabric is utilized. As such, there is room for additional capability to be added to the FPGA.

TABLE 1

FPGA Fabric Utilization

| Component | Utilization |
|---|---|
| FLASH Memory Manager | 1% |
| I2C Master | 1% |
| JTAG Config. Manager | 3% |
| SpaceWire Router | 10% |
| Total | 15% |

FIG. 4 is an architectural block diagram of a single board computer (SBC) according to an embodiment of the present invention.

Referring to FIG. 4, according to embodiments of the present invention, the SBC 400 may include a processor 402 (e.g., an application-specific integrated circuit (ASIC) or application-specific processor), random-access memory (RAM) 436 (e.g. DRAM, SRAM, or SDRAM), non-volatile memory (e.g., NAND flash) 454, a field-programmable gate array (FPGA) 418, and board-level physical layer interfaces 452. According to embodiments of the present invention, the processor 402 may be a processor ASIC and the FPGA 418 may act as a hardware coprocessor or accelerator as described above. According to some embodiments, the processor ASIC 402 may be directly connected to the RAM 436 via a memory controller 410. The RAM 436 may include SDRAM that has byte-wide power control to support recovery from SEFIs. For example, as described above, the processor ASIC 402 may power cycle a physical device in the SDRAM to clear any SEFIs.

For example, the processor ASIC 402 may include an Ethernet MAC 404, a SpaceWire router 406, a PROM and Input Output (IO) controller 408, a memory controller 410, a 1553 core 412, a serial connection 414, and a cPCI interface 416. The FPGA 418 may include one or more clocks 420 which may be generated by the FPGA 418 or received via a utility bus. The FPGA 418 may also include an I2C interface 422, a flash controller 424 configured to control the non-volatile memory 454, an Ethernet switch 426 coupled to the Ethernet MAC 404 and a gigabit Ethernet connection 448, a processor interface 428 in communication with the PROM 10 408 of the processor 402, a discrete interface 430, a JTAG interface 432, and a high speed SerDes interface 434. The SBC 400 also includes a Startup boot ROM (SuROM-) 438, an MRAM 440, 1553B hardware 442, 444, an RS422 interface 446, a SpaceWire connection 450 and a physical layer interface 452 that includes a plurality of ports (P0-P6).

According to embodiments of the present invention, the processor ASIC 402 may be a quad-core LEON4 processor ASIC 402 such as the Cobham Gaisler GR 740™. The processor ASIC 402 is fault-tolerant and is single-event latchup (SEL) immune up to an LET of about 60 Mev/mg/cm². The processor ASIC 418 may be manufactured on a 65 nm process and be radiation tolerant to 300 krad of total ionizing dose. The processor ASIC 402 may have internal Advanced Microcontroller Bus Architecture (AMBA) buses with peripherals that support external memory, JTAG-based debugging, an 8-port SpaceWire router 406, Gigabit Ethernet 404, SPI, and MIL-STD-1553B 412. The processor ASIC 402 may have a 250 MHz clock with a theoretical maximum performance of 1 GFLOP for both single and double precision floating-point operations. The processor ASIC 402 may be further configured to employ Reed-Solomon error correction for connected SDRAM as described above.

According to embodiments of the present invention, the FPGA 418 may supply the system with programmable hardware resources for user-defined hardware acceleration of the processor ASIC 402. The FPGA 418 may be, for example, a Microsemi RTG4™ FPGA. Mathematically intense algorithms like digital filters, FFTs, and the like, can be designed in VHDL and implemented on the FPGA 418. In some examples, the FPGA 418 is mapped into the IO space of the processor ASIC 402. Thus, the processor ASIC 402 may write data directly to memory (e.g. registers) on the FPGA 418 for processing and then read the results. In some examples, the FPGA 418 may handle discrete IO interfacing for the SBC 400 and has radiation hardened hardware support for high-speed SerDes 434 which may be needed for Ethernet, Serial RapidIO, and other CML-based protocols. The FPGA 418 may also include an Ethernet switch 426 as well as the I²C interfaces 422 needed to comply with the SpaceVPX and/or OpenVPX standards. The various features of the FPGA 418 (e.g. the high-speed SerDes 414) allow for the SBC 400 to comply with the switch and controller slot profiles defined in the OpenVPX and SpaceVPX standards. For example, some of these SerDes lanes may be connected to ultra-thin pipes on the control plane in a way that shares connector space with SpaceWire thin-pipes to allow this module to interoperate between OpenVPX and SpaceVPX.

According to embodiments of the present invention, the SBC 400 includes a flash memory controller 424 and flash memory 454. For example, the SBC 400 may include 2 GB (8 Gbit) of NAND flash memory. The flash memory controller 424 may be located in the FPGA 418 and handles block reads, writes, erase operations, etc., and generally hides the complexity of accessing the flash memory 454.

According to embodiments of the present invention, in addition to the SpaceWire and Ethernet communications, the SBC 400 may also include hardware to support MIL-STD-1553B communications as described above. For example, the processor ASIC 402 may include a 1553 core 412 that works in conjunction with a 1553 transceiver 442 located on the SBC 400 and connected to an output port (e.g. P5). Similarly, the SBC 400 includes support for high speed SerDes communications by utilizing SerDes hardware 434 integrated in the ASIC processor 418 and additional SerDes hardware such as a an RS-422 connection 446.

The SBC 400 may attach to other modules that have SRAM-based FPGAs (e.g. SRAM-based FPGAs located on sensors, instruments, or software-defined-radio modules) connected via the backplane and implemented as payload modules. The SRAM-based FPGAs may be connected using SpaceWire and SerDes, but may be configured using JTAG. In a space environment, the SRAM-based FPGAs may need to be scrubbed for bit errors in their configuration memory. In some embodiments, VHDL IP may run on the FPGA in order for the FPGA to configure SRAM-based FPGAs on payload modules and detect errors in their programming data. The IP conducts continuous error detection for the SRAM-based FPGAs' configuration memories without intervention from the processor ASIC 402. When a configuration error is detected in the memory of an off-board SRAM-based FPGA, the processor ASIC 402 will receive an interrupt. The processor ASIC 402 can then handle the error by either partially or completely reconfiguring the affected FPGA.

According to embodiments of the present invention, the SBC 400 may be configured for interoperability with OpenVPX and SpaceVPX standards. SpaceVPX is a standard that was derived from the OpenVPX standard. Each of the standards allow for interoperability with backplanes, enclosures, and modules at a relatively low cost. SpaceVPX and OpenVPX, however, have some different requirements that cause the standards to not be completely interoperable. For example, SpaceVPX may utilize SpaceWire on the control plane for communications which requires "thin pipe" connections, while OpenVPX utilizes Ethernet which requires "ultra-thin pipes" for connections. The SBC 400 may be configured with necessary hardware and functionality to operate in both the SpaceVPX and OpenVPX environments. According to embodiments of the present invention, the SBC 400 may operate as a switch in an OpenVPX environment and a system controller in the SpaceVPX environment.

According to embodiments of the present invention, the SBC 400 may include various hardware for directly communicating with peripheral devices and equipment according to the OpenVPX and SpaceVPX standards. Thus, the SBC 400 may be inserted into a system that meets either standard. For example, according to some embodiments, the SBC 400 includes SpaceWire hardware in the processor ASIC 402 and/or in the FPGA 418 (e.g. a SpaceWire router 406). Similarly, the processor ASIC 402 and/or the FPGA 418 may also include any necessary Ethernet hardware (e.g. an Ethernet MAC 404 and an Ethernet switch 426). SpaceWire generally uses two sets of differential pairs in each direction for transmitting and receiving data. Each of the SpaceWire differential pairs includes "thin pipe" wires that connect to an output port. In some embodiments, the SpaceWire hardware may include a router 406 (e.g. an 8-port router) connected to one or more output ports that connect to a control plane and/or data plane according to the SpaceVPX standard.

According to embodiments of the present invention, the SBC 400 also includes Ethernet hardware. The Ethernet hardware may be integrated in the ASIC processor 404, the FPGA 426 and/or at another location on the SBC 400. The Ethernet hardware may connect to a gigabit Ethernet port 448 for normal Ethernet communications and to one or more output ports (e.g. P1) of the SBC 400 for OpenVPX connections. For example, "ultra-thin pipe" wires may connect the Ethernet switch 426 to the same VPX connector as the SpaceWire pins. Due to the sharing of the connector pins, not all of the ports may be able to be implemented in each environment.

Figure 5:
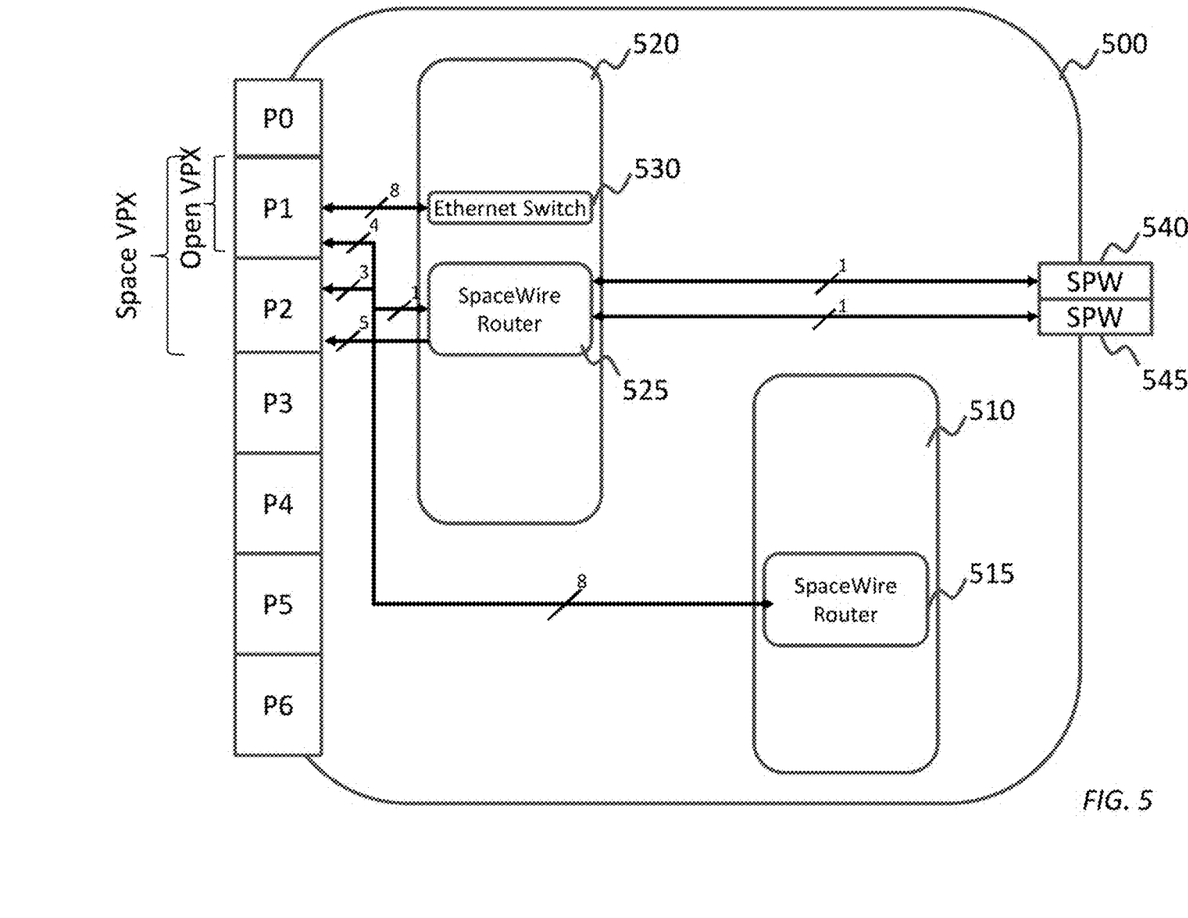
FIG. 5 is an architectural block diagram of a single board computer (SBC) for connecting to a SpaceVPX or Open-VPX control plane according to an embodiment of the present invention.

FIG. 5 is an architectural block diagram of a single board computer (SBC) for connecting to a SpaceVPX or OpenVPX control plane according to an embodiment of the present invention.

Referring to FIG. 5, according to embodiments of the present invention, the SBC 500 is configured to operate in SpaceVPX and OpenVPX environments. For example, the SBC 500 includes a processor ASIC 510 and an FPGA 520 that are configured to communicate with a control plane utilizing either SpaceWire or Ethernet connections. For example, according to embodiments of the present invention, the processor ASIC 510 includes an 8-port SpaceWire router 515. Similarly, the FPGA 520 may also include an 8-port SpaceWire router 525. The SpaceWire routers may utilize thin pipe connections and may be connected to VPX connectors 1 and 2 (P1 and P2) which connect to the control plane in a SpaceVPX system. One or both of the SpaceWire routers 515, 525 may connect to an additional SpaceWire port 540, 545 on the SBC 500.

According to embodiments of the present invention, the FPGA 520 includes an Ethernet switch 530 configured to communicate with a control plane in an OpenVPX system. The Ethernet switch 530 may utilize ultra-thin pipe connections to connect to VPX connector 1 (P1) which connects to the control plane in an OpenVPX system. Despite not using VPX connector 2 (P2) for connecting to the OpenVPX backplane, the SBC 500 may be plugged into port 2. Thus, the SBC 500 may utilize some of the same pins or ports for both SpaceVPX and OpenVPX control plane communications.

Figure 6:
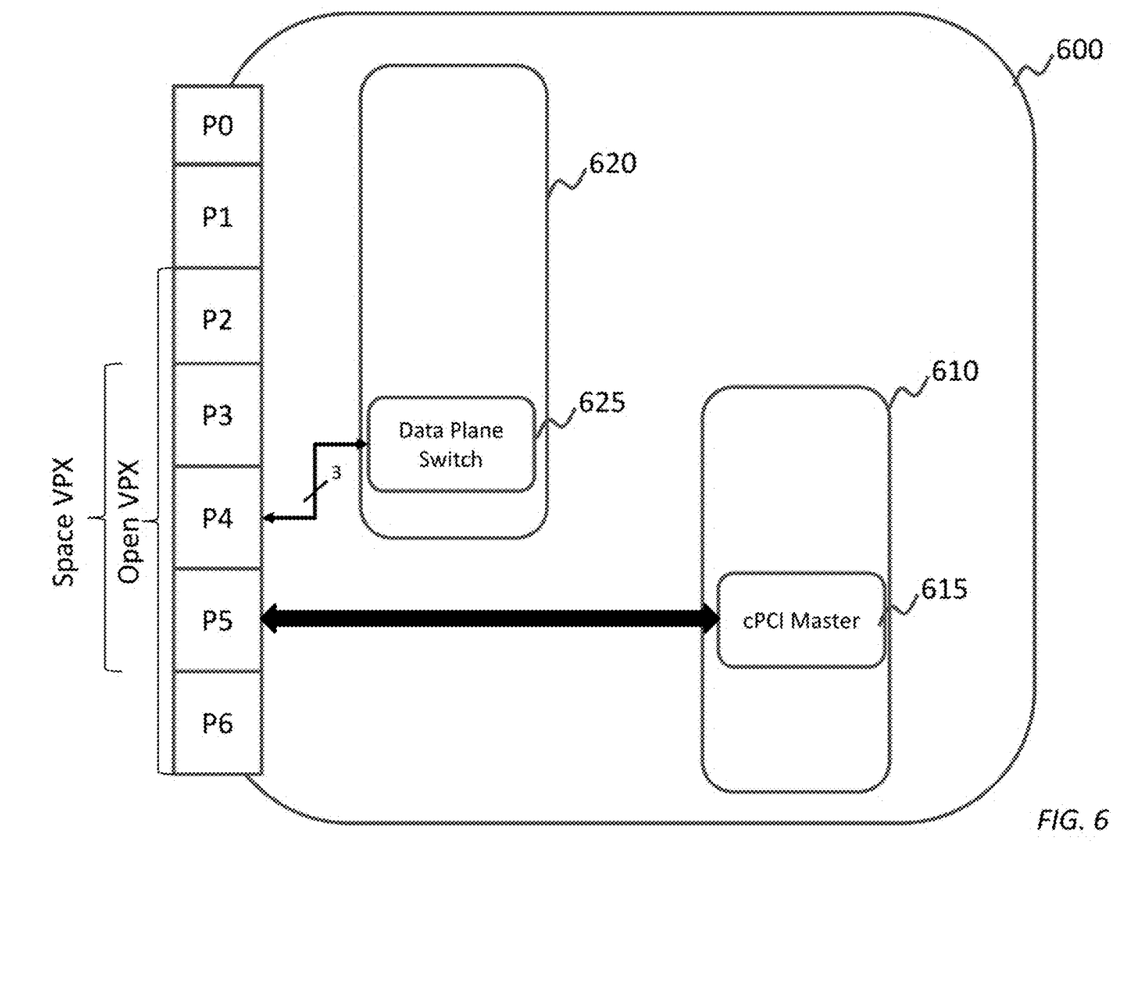
FIG. 6 is an architectural block diagram of a single board computer (SBC) for connecting to a SpaceVPX or Open-VPX data plane according to an embodiment of the present invention.

FIG. 6 is an architectural block diagram of a single board computer (SBC) for connecting to a SpaceVPX or OpenVPX data plane according to an embodiment of the present invention.

Referring to FIG. 6, according to embodiments of the present invention, the SBC 600 is configured to connect to a data plane in both SpaceVPX and OpenVPX systems. For example, the controller 600 may be configured to utilize VPX connectors 2-6 for data plane communications using the processor ASIC 610 and the FPGA 620. In some embodiments, the FPGA 620 may be configured to act as a data plane switch 625 that connects to a VPX connector (e.g. P4) through 3 fat pipes or 12 lanes. In some examples, the FPGA 620 may only have enough SerDes resources to connect to a single port, however, in other embodiments up to 3 VPX connectors (P3-P5) may be used for data plane communications in SpaceVPX systems and up to 5 VPX connectors (P2-P6) may be used in OpenVPX systems.

In some embodiments, the SBC 600 may utilize a shared cPCI bridge for both SpaceVPX and OpenVPX configurations. For example, the processor ASIC 610 may include a cPCI connection 615 (as described above) connected to port 5 (P5). In some examples, the cPCI connection 615 may be a 32-bit connection.

Thus, the SBC controller 600 may be used in both SpaceVPX and OpenVPX systems since the board is configured to interface with both types of systems and includes a form factor that may be plugged into either system.

As discussed above, embodiments of the present invention include a single-board computer (SBC) for deployment in space-flight applications. The SBC may meet the command- and data-handling requirements for missions requiring true space-grade radiation hardness and fault tolerance, for example, exceeding those that are typical in CubeSat and SmallSat applications. The SBC according to embodiments of the present invention may have a substantially lower cost, lower power, and smaller form factor than typical space-grade solutions presently available. The SBC according to embodiments of the present invention may use the MicroTCA standard, which is smaller than common 6 U-sized solutions but still allows interoperability with a diverse ecosystem of commercial development equipment. The SBC according to embodiments of the present invention may use QMLV or Class-S parts with total-ionizing-dose tolerance appropriate for deployment on long-term missions in MEO or GEO environments. The SBC according to embodiments of the present invention may include Space-Wire and Ethernet connections that allow for the SBC to be utilized in both SpaceVPX and OpenVPX environments A relevant device or component (or relevant devices or components) according to embodiments of the present invention described herein may be implemented utilizing any suitable hardware (e.g., an application-specific integrated circuit, FPGA, or DSP), firmware (e.g., VHDL), software, or a suitable combination of software, firmware, and hardware. For example, the various components of the relevant device(s) may be formed on one integrated circuit (IC) chip or on separate IC chips. Further, the various components of the relevant device(s) may be implemented on a flexible printed circuit film, a tape carrier package (TCP), a printed circuit board (PCB), or formed on a same substrate as one or more circuits and/or other devices. Further, the various components of the relevant device(s) may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, MRAM, PROM, and/or Flash memory. The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Further, it will also be understood that when one element, component, region, layer, and/or section is referred to as being "between" two elements, components, regions, layers, and/or sections, it can be the only element, component, region, layer, and/or section between the two elements, components, regions, layers, and/or sections, or one or more intervening elements, components, regions, layers, and/or sections may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

It will be understood that when an element or layer is referred to as being "on," "connected to," "coupled to," "connected with," "coupled with," or "adjacent to" another element or layer, it can be "directly on," "directly connected to," "directly coupled to," "directly connected with," "directly coupled with," or "directly adjacent to" the other element or layer, or one or more intervening elements or layers may be present. Furthermore, "connection," "connected," etc., may also refer to "electrical connection," "electrically connected," etc., depending on the context in which such terms are used as would be understood by those skilled in the art. When an element or layer is referred to as being "directly on," "directly connected to," "directly coupled to," "directly connected with," "directly coupled with," or "immediately adjacent to" another element or layer, there are no intervening elements or layers present.

As used herein, the terms "use," "using," and "used" may be considered synonymous with the terms "utilize," "utilizing," and "utilized," respectively.

Features described in relation to one or more embodiments of the present invention are available for use in conjunction with features of other embodiments of the present invention. For example, features described in a first embodiment may be combined with features described in a second embodiment to form a third embodiment, even though the third embodiment may not be specifically described herein.

Although this invention has been described with regard to certain specific embodiments, those skilled in the art will have no difficulty devising variations of the described embodiments, which in no way depart from the scope and spirit of the present invention. Furthermore, to those skilled in the various arts, the invention itself described herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents.

What is claimed is:

1. A radiation hardened single board computer (SBC) comprising:
   a processor application-specific integrated circuit (ASIC);
   synchronous dynamic random-access memory (SDRAM);
   non-volatile memory;
   a field programmable gate array (FPGA); and
   board-level physical layer interfaces configured to connect to an OpenVPX backplane and a SpaceVPX backplane, wherein the board-level physical layer interfaces comprise:
      a SpaceWire connection configured to connect with a Space VPX control plane using a first VPX connector and a second VPX connector; and
      an Ethernet connection configured to connect with an OpenVPX control plane using the first VPX connector.

2. The SBC of claim 1, wherein at least one of the processor ASIC and the FPGA comprise an 8-port SpaceWire router.

3. The SBC of claim 1, wherein the FPGA comprises an Ethernet switch.

4. The SBC of claim 1, wherein the SBC is configured to interface with one or more sensor boards via the OpenVPX backplane or the SpaceVPX backplane.

5. The SBC of claim 4, wherein the FPGA is configured to perform automated error detection and correction for errors found in a plurality of SRAM programming memory of FPGAs of the sensor boards due to radiation induced single event effects.

6. The SBC of claim 1, wherein the FPGA is configured to provide physical layer support for:
   high-speed serial interfaces;
   Low-Voltage Differential Signaling (LVDS) interfaces;
   an Inter-IC (I2C) interface; and
   Joint Test Action Group (JTAG) interfaces.

7. The SBC of claim 1, wherein the FPGA comprises a flash controller and wherein the nonvolatile memory comprises flash memory managed by the flash controller.

8. The SBC of claim 1, wherein the SDRAM comprises byte-wide power control and wherein the processor ASIC is configured to power cycle a physical location on the SDRAM when a single-event functional interrupt is detected.

9. The SBC of claim 1, wherein the processor ASIC is configured to employ Reed-Solomon error encoding on the SDRAM.

10. A radiation hardened single board computer (SBC) comprising:
    a processor application-specific integrated circuit (ASIC) comprising a first 8-port SpaceWire router;
    synchronous dynamic random-access memory (SDRAM) directly connected to the processor ASIC;
    a field programmable gate array (FPGAI) connected to the processor ASIC, wherein the FPGA is configured to perform co-processing functions to reduce the load on the processor ASIC and the FPGA comprises a second 8-port SpaceWire router and an Ethernet switch; and
    a board-level physical layer interface comprising a first VPX connector and a second VPX connector, wherein the first and second SpaceWire routers are connected to the first VPX connector and the second VPX connector, and wherein the Ethernet switch is connected to the first VPX connector.

11. The SBC of claim 10, wherein the first and second SpaceWire routers are connected to the first and second VPX connectors using at least one thin pipe.

12. The SBC of claim 10, wherein the Ethernet switch is connected to the first VPX connector using at least one ultra-thin pipe.

13. The SBC of claim 10, wherein the SBC is configured to operate in both SpaceVPX and OpenVPX environments.

14. The SBC of claim 10, wherein the FPGA comprises a flash controller and wherein the nonvolatile memory comprises flash memory managed by the flash controller.

15. The SBC of claim 10, wherein the SDRAM comprises byte-wide power control and wherein the processor ASIC is configured to power cycle a physical location on the SDRAM when a single-event functional interrupt is detected.

16. The SBC of claim 10, wherein the processor ASIC is configured to employ Reed-Solomon error encoding on the SDRAM.

17. A radiation hardened single board computer (SBC) comprising:
    a processor application-specific integrated circuit (ASIC);
    synchronous dynamic random-access memory (SDRAM), wherein the SDRAM comprises byte-wide power control and wherein the processor ASIC is configured to power cycle a physical location on the SDRAM when a single-event functional interrupt is detected;
    non-volatile memory;
    a field programmable gate array (FPGA) and;
    board-level physical layer interfaces configured to connect to an OpenVPX backplane and a SpaceVPX backplane, wherein the board-level physical layer interfaces comprise:
       a SpaceWire connection; and
       an Ethernet connection.

* * * * *